United States Patent [19]

Kobayashi

[11] Patent Number: 5,587,975
[45] Date of Patent: Dec. 24, 1996

[54] MAGNETO-OPTICAL DISK REPRODUCING APPARATUS WITH GAIN AND OFFSET CONTROLLED BY A REFERENCE PATTERN READ FROM THE DISK

[75] Inventor: Shoei Kobayashi, Kanagawa, Japan

[73] Assignee: Sony Corporation, Tokyo, Japan

[21] Appl. No.: 545,957

[22] Filed: Oct. 20, 1995

[30] Foreign Application Priority Data

Oct. 24, 1994 [JP] Japan ................................. 6-258283

[51] Int. Cl.$^6$ ..................................................... G11B 5/09
[52] U.S. Cl. ........................... 369/13; 369/48; 369/54
[58] Field of Search ........................... 369/13, 54, 48, 369/47, 275.3, 275.259; 360/59, 114; 365/122

[56] References Cited

U.S. PATENT DOCUMENTS

| | | | |
|---|---|---|---|
| 4,509,155 | 4/1985 | Masuda et al. | 369/48 |
| 4,611,317 | 9/1986 | Takeuchi et al. | 369/58 |
| 5,001,693 | 3/1991 | Kakuta | 369/48 |
| 5,361,247 | 11/1994 | Fuji et al. | 369/48 |
| 5,463,603 | 10/1995 | Petersen | 369/48 |

*Primary Examiner*—Tan Dinh
*Attorney, Agent, or Firm*—William S. Frommer; Alvin Sinderbrand

[57] ABSTRACT

Data that is recorded in a track on a magneto-optical disk and which contains a reference pattern that exhibits distinct amplitude levels is read from that disk by an optical head and then gain controlled and offset controlled before being detected. Gain and offset control values are calculated from the upper and lower amplitude levels in the reference pattern read from the disk, and are fed back to gain and offset control circuits. As a result, data that is read by the optical head is reproduced with proper gain and offset.

20 Claims, 7 Drawing Sheets

| REFERENCE AREA 528 | USER DATA 2048 B | UD 40B | CRC 8B | ECC 256B |

FIG.3

MAGNETO-OPTICAL DISK REPRODUCING APPARATUS WITH GAIN AND OFFSET CONTROLLED BY A REFERENCE PATTERN READ FROM THE DISK

BACKGROUND OF THE INVENTION

This invention relates to gain and offset control apparatus for reading data from an optical disk, preferably a magneto-optical disk, and more particularly, to such apparatus that is controlled in response to reference patterns read from the disk.

Optical disks are recorded with a spiral track or with concentric tracks in which information is represented by pits. Such disks are driven either at a constant angular velocity (CAV), whereby the density of the pits generally decreases at those tracks located at a greater radius from the center, or at a constant linear velocity (CLV), whereby the rotary speed of the disk increases as the radius of the track being scanned increases such that the density of the pits generally is constant over the entire disk.

The information recorded on an optical disk generally includes useful information, such as audio information for an audio disk, video and video/audio information for a video disk and computer file data for a computer disk (such as a CD ROM). In addition to such useful information, optical disks include address information to permit a user to access a desired portion of the disk, such as a desired data sector, and servo information which is used for tracking control (i.e. to assure "center-line" tracking of a recording or pickup head) and to synchronize the clock of the disk drive with the actual speed of the disk. Servo information may be recorded in a pre-existing groove that is formed continuously along the track of a spiral-track optical disk or, alternatively, the servo information may be distributed along the spiral or concentric tracks in discrete servo areas. For example, when manufacturing the optical disk, such discrete servo areas may be pre-formed as part of the manufacturing process.

When reproducing information from an optical disk, whether that disk is a playback-only (or read-only) disk, a write-once disk, a recordable disk (such as a magneto-optical disk) or a hybrid disk having read-only and recordable areas, the amplitude as well as the offset of the reproduced signals (as used herein, "offset" refers to the drift in the center or "zero" level of the reproduced signals) may fluctuate because of fluctuations inherent in the optical system. Such optical system fluctuations are attributed to fluctuations in the disk speed, fluctuations occasioned by variations or changes in circuit parameters or fluctuations due to changes in the reflectance or other optical properties of the recording medium or changes in the Kerr rotation angle. While fluctuations in circuit parameters, for example, from one disk drive to another, can be compensated by performing suitable gain adjustments as part of the disk drive manufacturing operation, such "factory adjustments" are time consuming, require the skill of expert technicians and often are not completely successful. Generally, such factory adjustments are not helpful in eliminating drive-to-drive fluctuations in the reflectance or optical properties of the recording medium or in changes in the Kerr rotation angle. Additionally, variations in the amplitude of the reproduced signals that may be caused simply by age of the disk drive, or amplitude variations due to small defects in the recording medium or due to the presence of dust or dirt on the recording medium certainly cannot be compensated or even predicted by factory adjustments.

It is important, therefore, to provide a dynamic technique for detecting the amplitude of data recorded on an optical disk, such as a magneto-optical disk, even though the signal levels reproduced from such data may change, or may be subject to fluctuations from the nominal factory pre-set values thereof.

OBJECTS OF THE INVENTION

Therefore, it is an object of the present invention to provide an improved technique for recovering data from an optical disk, such as a magneto-optical disk, notwithstanding fluctuations in the operating parameters of the disk or the disk drive that is used to play that disk.

Another object of this invention is to provide gain and offset control apparatus that are adjustable automatically to assure accurate recovery of useful data reproduced from the disk.

A further object of this invention is to record a periodic reference pattern on the disk and to produce gain and offset control signals therefrom to adjust the gain and offset of data reproduced from the disk, thereby assuring accurate recovery thereof.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for reproducing data from an optical disk, such as a magneto-optical disk, the data being recorded in a track which contains a reference pattern exhibiting distinct amplitude levels. An optical head reads data in the track and supplies a signal representing such data to a gain control circuit having an adjustable gain. The output from the gain control circuit is supplied to an offset control circuit which is adjustable to vary the offset of the gain-controlled signal. A level detector detects upper and lower amplitude levels in the reference pattern read by the optical head and supplied through the gain and offset control circuits; and amplitude and offset control values are calculated from the upper and lower amplitude levels to adjust the gain and offset of the gain and offset control circuits, respectively, whereby data read by the optical head is reproduced with predetermined gain and offset.

This invention also relates to recording/reproducing apparatus which records information in sectors in a track as pits, with each sector being comprised of data segments interspersed with servo areas. As a feature of this invention, useful information as well as a reference pattern are recorded in a sector, with the reference pattern being recorded in a number of data segments located in a leading position of each sector and exhibiting distinct amplitude levels. The aforementioned gain and offset control values are calculated in response to the detection of these distinct amplitude levels when an optical head reads the reference pattern.

BRIEF DESCRIPTION OF THE DRAWINGS

The following detailed description, given by example and not intended to limit the present invention solely thereto, will best be understood in conjunction with the accompanying drawings in which:

FIG. 3 is a schematic representation of the data format of a sector of useful data recorded on the disk;

DETAILED DESCRIPTION OF A PREFERRED EMBODIMENT

Figure 1:
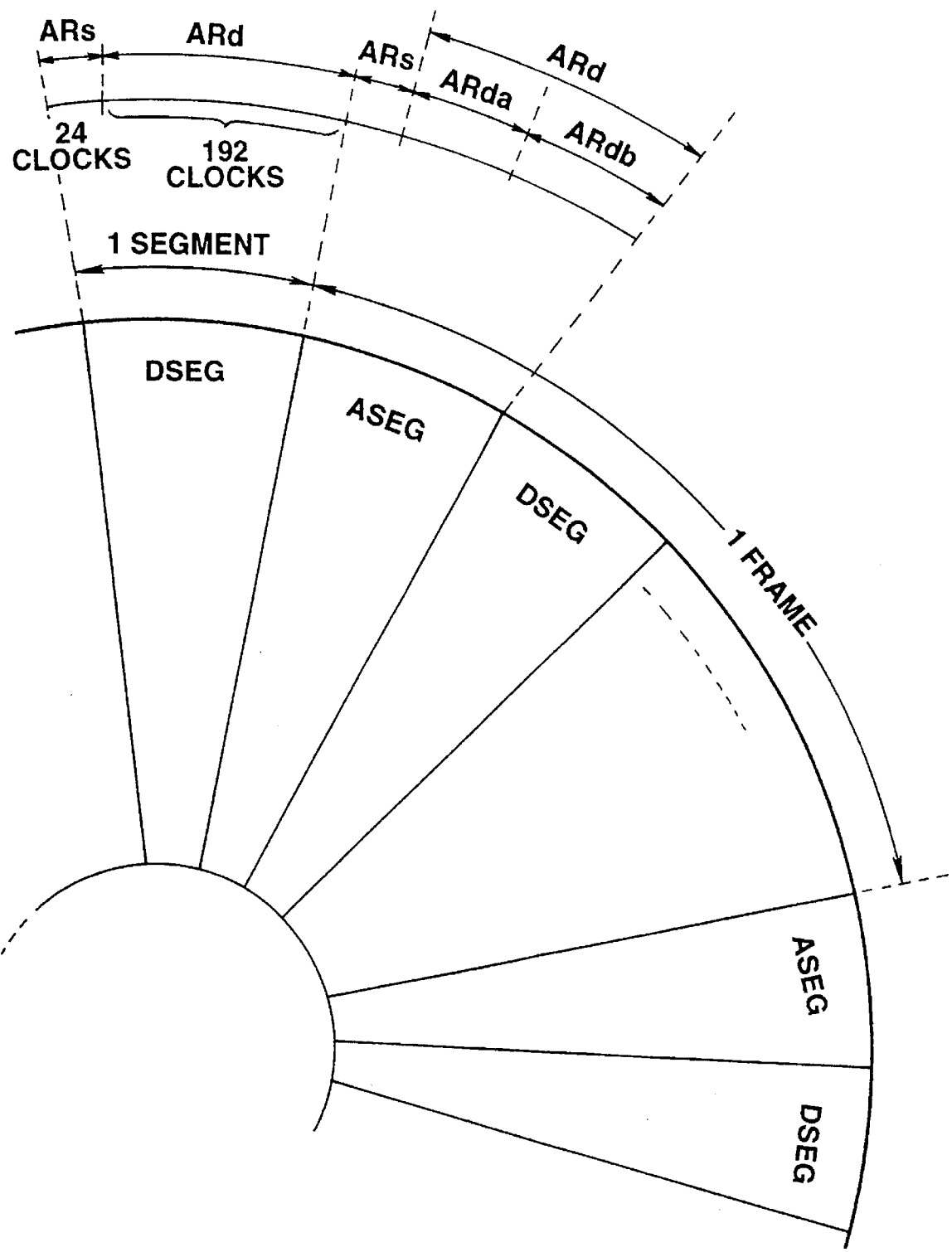
FIG. 1 is a schematic representation of a portion of a magneto-optical disk.
Figure 2:
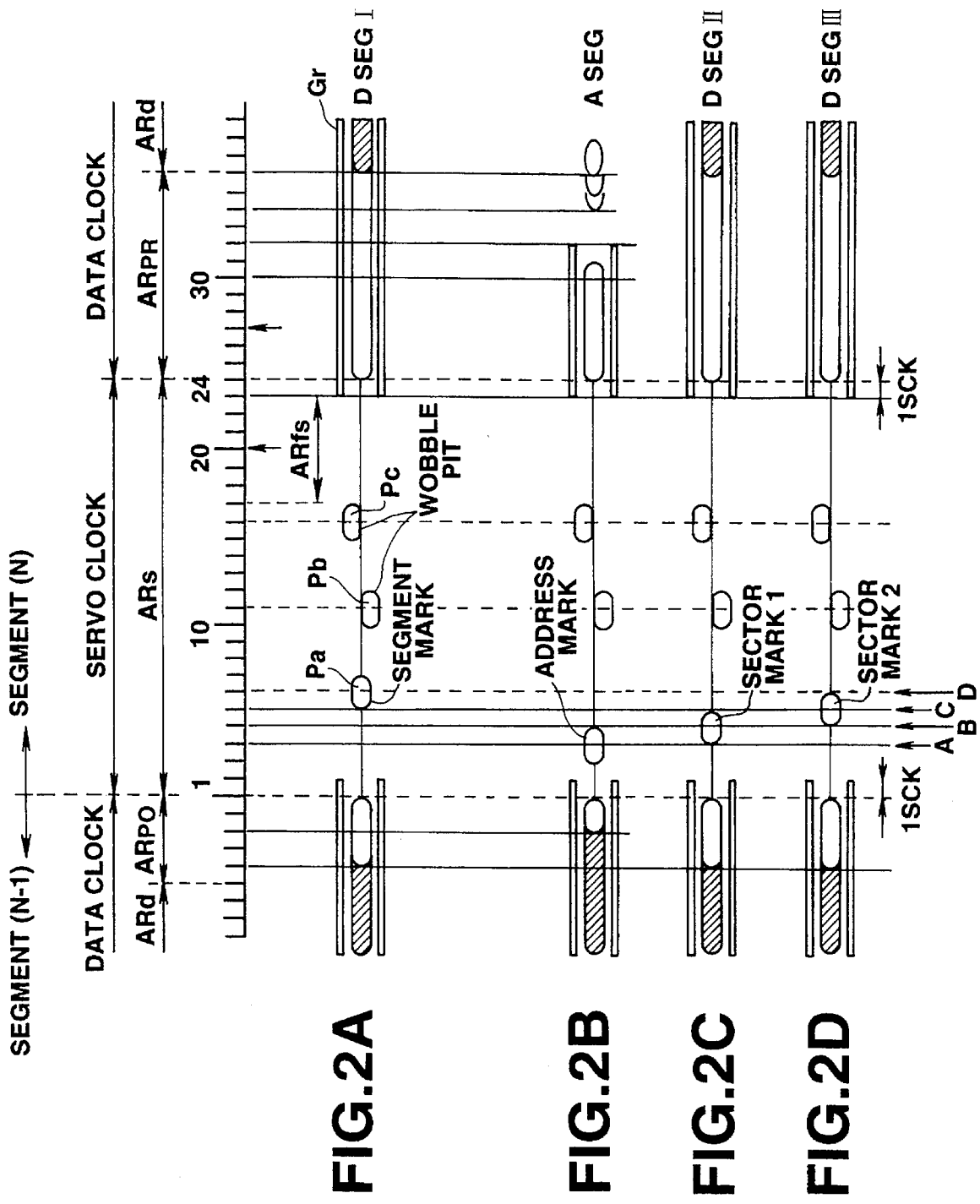
FIGS. 2A–2D are schematic representations of the format in which pits are recorded in the servo area of each segment recorded on the disk.

Referring now to the drawings, and in particular to FIG. 1, there is illustrated a portion of a track on the magneto-optical disk with which the present invention finds particular application. The portion of the track shown in FIG. 1 may be a portion of a spiral track recorded continuously from an inner radius to an outer radius or, alternatively, it may be a portion of one of several concentric tracks. It will be appreciated that the present invention is not contingent on whether a spiral track or concentric tracks are recorded on the disk. To account for the use of one spiral track or several concentric tracks, the description herein refers to a "turn" which is intended to mean one complete concentric track or one 360° rotation of a spiral track.

One turn is divided into 1400 segments, which are identified as address segments (ASEG) and data segments (DSEG), as shown in FIG. 1. Each address segment contains information (it is appreciated that in the magneto-optical disk, information is recorded as pits) which identifies the radial position of the address segment and also the circular position thereof. The data segments include useful data, such as audio information (if the magneto-optical disk is an audio disk), video information (if the magneto-optical disk is a video disk) or computer file information (if the magneto-optical disk is a computer storage medium). A frame is composed of 1 address segment and 13 data segments; and there are 100 frames recorded in a complete turn. Thus, each turn consists of 100 address segments and 1,300 data segments.

Figure 5:
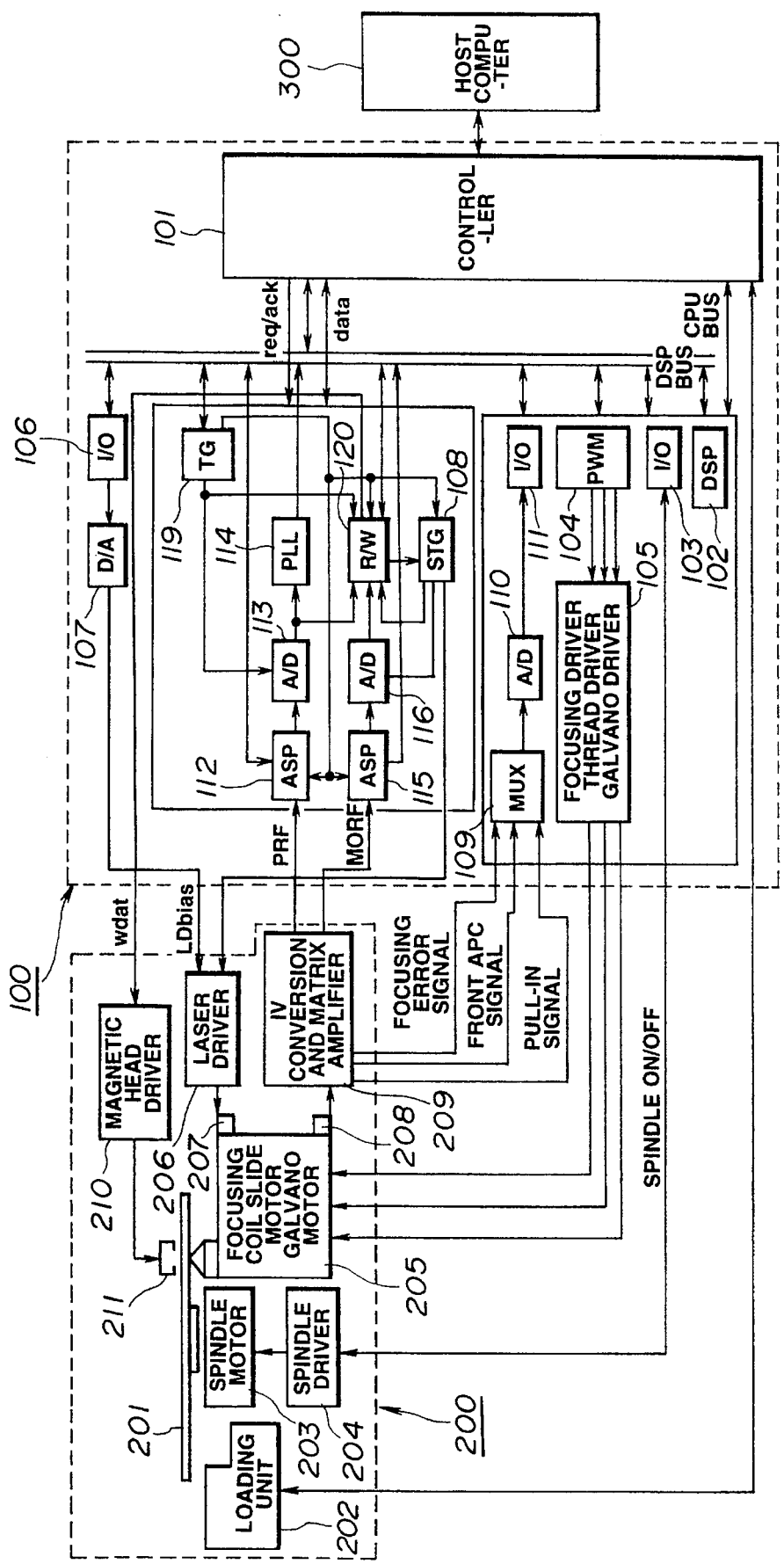
FIG. 5 is a block diagram of a magneto-optical disk drive in which the present invention finds ready application.

Typically, a unit of data is recorded as a pit; and as will be seen from FIGS. 2A–2D, the duration of each pit is approximately two clock cycles, with a clock cycle being generated by a reference clock (or system clock) in the disk drive shown in FIG. 5.

Each segment, whether an address segment or a data segment, is comprised of 216 clock cycles and each segment contains a servo portion (or area) ARs having a duration of 24 clock cycles and a data portion ARd having a duration of 192 clock cycles. The data portion of the address segment ASEG includes an address section ARda which contains address information and a laser control section ARdb which is used by the disk drive components shown in FIG. 5 to control various operating parameters of the laser beam used to scan the magneto-optical disk.

The format of the servo portion (or area) ARs of the address segment and of the different types of data segments is shown in FIGS. 2A–2D. Each servo portion (or area) contains three pre-recorded pits, identified as a mark pit $P_A$ and wobble pits $P_B$ and $P_C$. The positions of the wobble pits are fixed and the position of the mark pit is dependent upon the particular type of segment in which that mark pit is recorded. Referring first to the wobble pits $P_B$ and $P_C$, these pits are located at clock cycles 11 and 16 and are offset from the center line of the track by, for example, ¼ of a track pitch, as shown in FIGS. 2A–2D. These wobble pits are used for tracking control. It is appreciated that if the scanning laser beam is offset, or displaced, from the center line of the track, the signal produced from one of the wobble pits $P_B$ or $P_C$ will be greater than the other. Thus, an indication of the direction and intensity of a tracking error is produced and may be readily compensated. In addition, since the positions of the wobble pits $P_B$ and $P_C$ are fixed, pulses produced by scanning these pits will exhibit a frequency determined by the speed of the disk, thereby permitting a servo clock (from which system clock pulses are generated) to be synchronized therewith.

As shown in FIGS. 2A–2D, each servo portion in each segment includes a section ARfs in which no pits are recorded. This section is known as a focus sample section having a duration of six clock cycles and is used to control the focusing servo operation of the disk drive.

The format of the pits shown in FIGS. 2A–2D is preferred because it minimizes that portion of the disk in which no pits are formed (known as the mirror portion), thereby reducing the possibility that "ghost pits" will be produced during the disk molding process. It is preferred, therefore, to record each pit with a duration of two clock cycles and to separate the pits in the servo portion by at least five clock cycles. Consequently, inter-pit interference may be kept desirably small.

Mark pit $P_A$, recorded in the leading section of each servo portion, identifies the segment in which the mark pit is recorded as either an address segment ASEG or a data segment DSEG. If a data segment, the position of the mark pit $P_A$ also identifies the data segment as the first data segment in a sector, the last data segment in the sector or any other intermediate data segment in the sector. The number of segments in a sector is dependent upon the radial position of that sector. If the mark pit is recorded in clock cycles 3–4 of a segment, that pit identifies the segment as an address segment ASEG. If the mark pit is located at clock cycles 4–5, the pit identifies the segment as a data segment, and moreover, as the leading, or first, data segment in the sector. If the mark pit $P_A$ is located at clock cycles 5–6, the pit identifies the segment as the last data segment of a sector. Finally, if the mark pit $P_A$ is located at clock cycles 6–7, the pit identifies the segment as any data segment, other than the first or last, in the sector. The presence and position of a mark pit are determined by generating sampling pulses at those clock cycles identified as A, B, C and D, shown in FIGS. 2A–2D. Thus, if a mark pit $P_A$ is sensed by sampling pulse A, the segment in which that mark pit is located is identified as an address segment. If the mark pit is sensed by sampling pulse B, the segment is detected as the first segment of a sector. If the mark pit is sensed by sampling pulse C, the segment is detected as the last segment of a sector. And if the mark pit is sensed by sampling pulse D, the segment is detected as any intermediate segment in the sector.

It is appreciated that since the identity of a segment is readily determined simply by sensing the position of the mark pit $P_A$, it is not necessary to provide substantial segment identifying data which otherwise would detract from the amount of data that can be recorded in the data portion of each segment. As a result, the servo portion can be made smaller and information is recorded with higher efficiency.

Figures 4A, 4B:
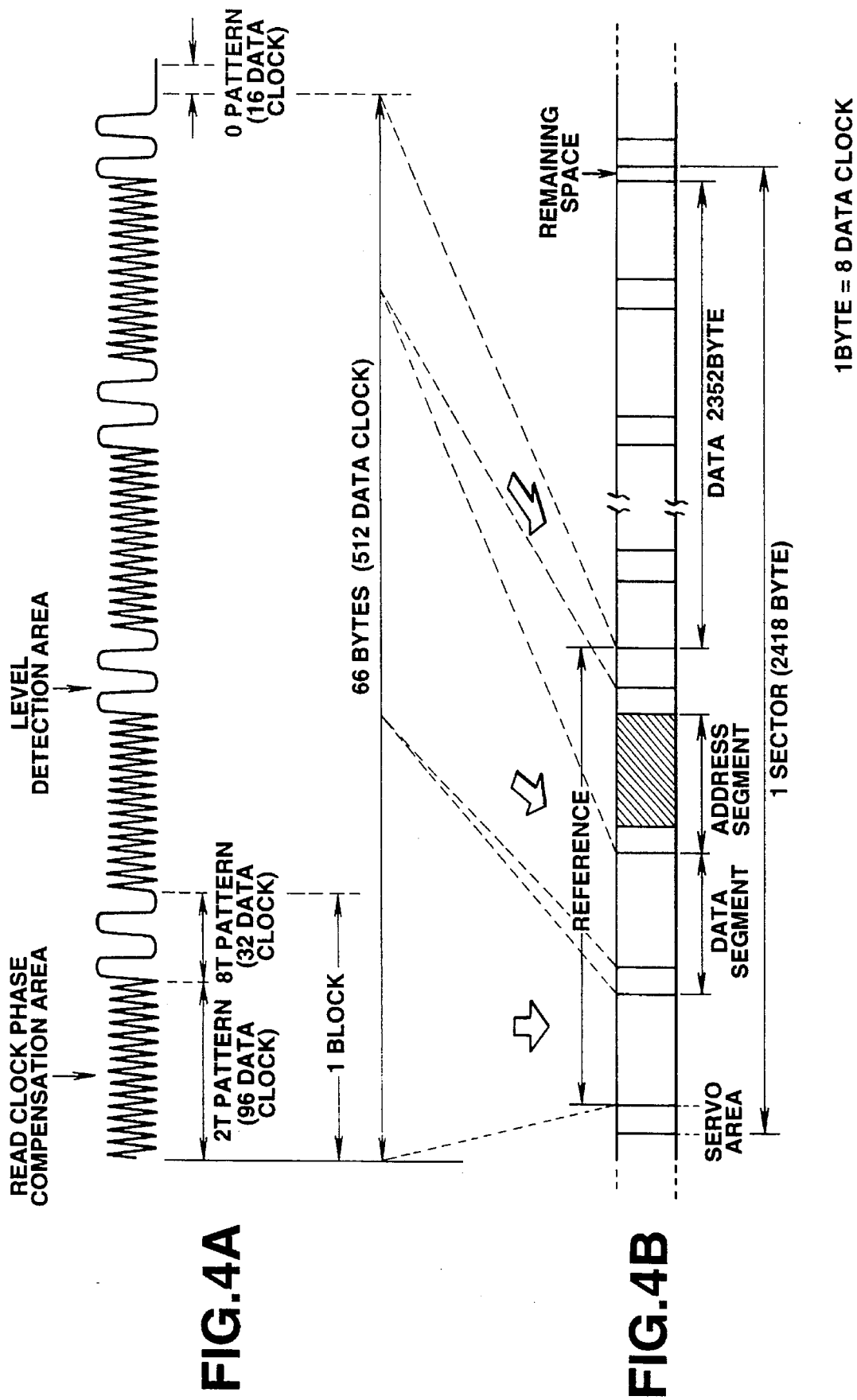
FIGS. 4A and 4B represent the periodic reference pattern that is recorded in each sector on the disk.

FIG. 3 schematically represents a section of useful information, or data, that is distributed in a number of data segments. The sector includes a reference area, a data area (referred to as user data), a reserved area UD, a cyclic redundancy code area CRC and an error correcting code area ECC. As will be described in greater detail below, the reference area extends for a duration of 528 clock cycles, or 66 bytes (it will be seen that the reference area includes a reference pattern comprised of 64 bytes plus 2 bytes of a "0" pattern). The data area includes 2,048 bytes of user data (i.e. data that may be recorded by the user or data that is of interest to the user, such as audio, video or computer data). The reserved area extends for 40 bytes which may include, for example, 8 bytes of vendor data plus 32 bytes of data that may be recorded as the user sees fit. The CRC area extends for 8 bytes and the ECC area extends for 256 bytes. As shown in FIG. 4B, interspersed within the sector of 2,418 bytes are periodic servo areas, each being pre-recorded with the magneto-optical disk to provide the wobble bits discussed above.

It will be appreciated that each byte exhibits a duration of 8 clock cycles (a clock cycle also is referred to herein as a data clock); and it is seen that a segment, whether it is a data segment or an address segment, extends from the beginning of one servo area to the beginning of the next. It is also seen that each address segment ASEG is pre-recorded with the magneto-optical disk; and user data is interrupted by the pre-recorded servo areas.

In accordance with the present invention, a reference pattern is recorded at the beginning portion of each sector. The reference pattern is shown in FIG. 4A and is comprised of 64 bytes (or 512 clock cycles) of a repetitive reference pattern plus two bytes (or 16 clock cycles) of what is shown as a "0" pattern. From FIG. 1 it is seen that each servo area is comprised of 24 clock cycles and the immediately following data area is comprised of 192 clock cycles. The reference pattern, which is comprised of 528 clock cycles, thus is recorded in the data areas of the respective segments such that, for example, the first 192 clock cycles of the reference pattern are recorded following the first servo area and then the next 192 clock cycles are recorded after the next-following servo area and then, after the address segment (and servo area), the remaining 144 clock cycles of the reference pattern are recorded. That is, the reference pattern is distributed into data segments; and it is seen that the last portion of the reference pattern fills only a portion of a data segment, the remainder of which contains useful data, as shown more clearly in FIG. 4B. Stated otherwise, the reference pattern is distributed over the leading segments of a data sector. It is appreciated that no portion of the reference pattern is recorded in the address segment shown in FIG. 4B because the address segment is pre-recorded throughout a turn, as discussed above in conjunction with FIG. 1.

Referring more particularly to the reference pattern shown in FIG. 4A, it is appreciated that this reference pattern is repeated in each of n blocks, wherein n=4 in the preferred embodiment. The reference pattern includes two distinct waveforms: a waveform identified as a "2T" pattern, wherein T is a clock cycle, and a waveform identified as the "8T" pattern. The "2T" pattern is represented as 110011001100 . . . and the "8T" pattern is represented as 1111111100000000111111100 . . . . The "2T" pattern is referred to as the read clock/phase compensation area and the "8T" pattern is referred to as the level detection area. In particular, the "8T" pattern exhibits two distinct amplitude levels, a minimum level and a maximum level, both of which are sampled and used to derive gain and offset control values for controlling the gain and offset of signals recovered from the recorded pits in order to interpret the pits as 0's and 1's. The "2T" pattern exhibits a substantially higher frequency (four times the frequency of the "8T" pattern) and is used to detect phase shifts due to changes in the rotary speed of the disk and also to synchronize with the disk rotation the clock signals generated by the disk drive. As is clear from FIG. 4A, the reference pattern is repeated n times in the reference area of the data sector.

A block diagram of the disk drive used to record on and reproduce from the magneto-optical disk is shown in FIG. 5. More particularly, the disk drive is comprised of a drive section 200 and a control section 100. Commands and data are exchanged between the control section and the drive section; and data originates with and is destined for a host computer 300. Operations of the disk drive are controlled by a controller 101 which communicates with host computer 300 via a suitable interface, such as a SCSI interface. Controller 101 appends CRC and ECC codes to data originating with host computer 300 and intended to be recorded on, for example, disk 201 and also serves to detect such CRC and ECC codes from data that is reproduced from the disk in order to correct such reproduced data in the event that errors are present. The data thus corrected by controller 101 then is transmitted to the host computer.

A digital signal processor 102 is included in control section 100 and functions to process the commands received from controller 101 so as to control drive section 200, thereby regulating the rotary speed of disk 201, the operation of the laser head and the operation of the magnetic head in the recording and reproduction of data. For example, digital signal processor 201 transmits commands to a spindle driver 204 via an input/output (I/O) circuit 103 to control spindle motor 203 which rotates disk 201. If an MO disk, as an example, is loaded onto drive section 200 by a loading mechanism 202, digital signal processor 102 commands spindle driver 204 to drive spindle motor 203 such that the disk is brought up to proper operating speed. When this speed is reached, a suitable signal is supplied from spindle driver 204 via I/O circuit 103 to digital signal processor 102 indicating that the disk speed has been stabilized and that a read or write operation may begin. While the disk is brought up to proper speed, digital signal processor 102 controls pickup drive motors 205 to position the laser head either to the inner portion of disk 201 or to the outer portion thereof such that the laser beam is positioned outside the user information area. Motors 205 are controlled by a pulse width modulation (PWM) circuit 104 which, in turn, controls driver 105 to control the motors 205. While outside the useful information area, the laser optics are controlled to focus the laser beam and to adjust the power thereof. It is preferred to carry out these operations outside the useful information area to avoid unintentional erasure or distortion of previously recorded data by the laser beam. At this time, the bias current of laser diode 207 is set by laser driver 206 in response to the control signal LDbias supplied thereto from digital signal processor 102 via an input/output (I/O) circuit 106 and digital-to-analog (D/A) converter 107. The digital signal processor also controls a timing generator (STG) 108 via the DSP bus to control the laser driver to turn on laser diode 207 at the proper times.

The laser beam emitted by the laser diode is reflected from disk 201 to a photodetector 208, the output of which is converted by a current-to-voltage (I/V) converter and matrix amplifier 209 to a voltage which represents the magnitude of the reflected laser beam. At this time, with the beam positioned at the inner or outer portion of disk 201, an automatic power control (APC) signal is produced by I/V converter 209 and supplied to a multiplexer 109 of control section 100. This automatic power control signal is referred to as a "front" APC signal and is supplied by multiplexer 109 to A/D converter 110 for conversion into digital form so as to be supplied, via an input/output (I/O) interface circuit 111 to digital signal processor 102. The intensity of the reflected laser beam thus is detected by the digital signal processor to control the bias current supplied to the laser diode, thereby maintaining the proper intensity of the laser beam.

I/V converter and amplifier 209 also generates a focusing error signal in response to the reflected laser beam picked up by detector 208; and this focusing error signal is supplied by multiplexer 109, A/D convertor 110 and I/O interface 111 to digital signal processor 102. The digital signal processor responds to this focusing error signal to determine if the laser beam emitted by laser diode 207 is properly focused on disk 201. If not, the focusing lens (or lenses) of the laser optics is adjusted to provide proper focusing. For example, a suitable control signal is supplied from digital signal processor 102 via the DSP bus to PWM circuit 104 which, in turn, controls focusing driver 105 to adjust the focus condition of the laser beam. When the beam is properly focused, that is, when the focus control servo loop which generates the focusing error signal has been stabilized, I/V converter and amplifier 209 produces a playback RF signal (PRF) exhibiting a substantially constant amplitude. This PRF signal is supplied to an A/D converter 113 by an analog signal processing circuit (ASP) 112 and thence to a clock generator (PLL) 114, which includes a phase locked loop but at this time is free running. Timing pulses are produced by frequency dividing the free running frequency of the clock generator by a pre-set divisor. Clock generator 114 controls an analog signal processing circuit (ASP) 115 to generate sampling pulses, or windows, at those times during which the wobble pits are expected, as discussed above in connection with FIGS. 2A–2D. If such wobble pit detection is confirmed a predetermined number of successive times, clock generator 114 is recognized as being phase-locked to disk 201.

Once the clock generator is synchronized with the rotary speed of disk 201, the mark pits shown in FIGS. 2A–2D are sensed in order to identify the particular segment being scanned by the laser beam. Clock generator 114 thus cooperates with ASP 115 to generate the sampling pulses, or windows, at positions A, B, C and D (as best seen in FIGS. 2A–2D) in order to determine the position of the mark pit in each servo area. It is appreciated that when an address mark is detected, frame synchronization can be readily established and a suitable frame counter thus may be reset so as to be incremented with each succeeding address mark. Moreover, since each frame is comprised of 14 segments, once the frame counter is reset, it is used to generate the sampling pulse, or window, at position A after 14 segments have been counted, thereby maintaining synchronism with each address mark. Proper synchronism thus is effected between clock generator 114 and disk 201.

By detecting and decoding track and frame addresses, which preferably are recorded in Gray code, the current position of the laser pickup is sensed. In one embodiment, the frame code that is reproduced from the address segment is compared to the frame count produced on a frame-by-frame basis by the frame counter; and the confirmation of the frame code with the frame count confirms synchronization.

Digital signal processor 102 also controls the radial movement of the laser head in response to the detection of the address information picked up by the head. More particularly, the digital signal processor controls, via the DSP bus and PWM circuit 104, thread driver 105 which, in turn, drives slide motor 205 to shift the laser head to a target track. When the target track is reached, a tracking error derived from the wobble pits $P_B$ and $P_C$ recorded in the servo areas is sensed; and digital signal processor 102 responds to this tracking error to feed back a tracking control signal via PWM circuit 104 to galvano driver 105 to drive galvano motor 205. It is appreciated, then, that the slide motor provides a coarse adjustment to the laser head and the galvano motor provides a fine adjustment thereto. Thus, a desired track is rapidly accessed and tracked.

Preferably, magneto-optical disk 201 is driven with constant linear velocity (CLV) such that the density of the pits, that is, the density at which data is recorded, remains substantially constant notwithstanding changes in the radial position of the track in which the data is located. Consequently, the data clock rate increases when data is recorded/reproduced at greater radial positions. The clock generator 114 generates such data clock pulses by multiplying the frequency, or repetition rate, of the phase locked loop clock pulses by the factor M/N, where the ratio M/N changes as a function of the radial position of the laser head. These data clock pulses are supplied to a timing generator 119 which supplies appropriate data clocks to a recording/reproducing (or read/write) circuit 120.

During a recording mode, recording/reproducing circuit 120 is supplied with data from host computer 300 to be recorded on disk 201. Preferably, the data to be recorded is scrambled (by a scrambling technique which forms no part of the present invention per se and is not further discussed herein) and then modulated as NRZI data. The NRZI data wdat is synchronized with the data clock generated by timing generator 119 and supplied to a magnetic head driver 210 which drives magnetic head 211 for recording this data. Head 211 generates a magnetic field in response to the modulated data wdat and applies this magnetic field to the data portion ARd of the segment being recorded on disk 201. During the recording mode, the disk is superheated to the Curie temperature by the laser beam emitted by laser diode 207, and in the environment of the magnetic field results in the recording of the data signal wdat. Also, and prior to the recording of the data signal in the data portion ARd of the segment, the reference pattern shown in FIG. 4A is supplied to magnetic head driver 210 for recording in the leading segments of a sector, as shown in FIG. 4B. Thus, the repetitive reference pattern formed of alternating 2T and 8T waveforms, repeated n times, is recorded at the beginning of each sector. As is apparent from FIG. 4B, the recording of this reference pattern is interrupted when the presence of a servo area is reached, thereby preventing overwriting of the servo areas.

When the pit pattern recorded on the magneto-optical disk is played back, the magneto-optical RF signal (MORF) produced by I/V converter and amplifier 209 is supplied to analog signal processor (ASP) 115 which functions to adjust the gain and offset of the recovered signal prior to digitizing thereof by A/D converter 116. It is recalled that because of changes in various operating parameters of disk 201 or the disk drive itself, the amplitude or gain of the reproduced signal may change and the offset of that signal likewise may vary. Such changes and variations may introduce errors into the digital signal produced by A/D converter 116. Desirably, the present invention provides gain and offset adjustments to the MORF signal derived from the pit pattern scanned on disk 201 to effect a substantially constant gain and offset. As shown more particularly in FIG. 6, ASP 115 cooperates with recording/reproducing circuit 120 to establish a feedback loop to compensate changes and variations in gain and offset that may be present in the MORF signal.

Figure 6:
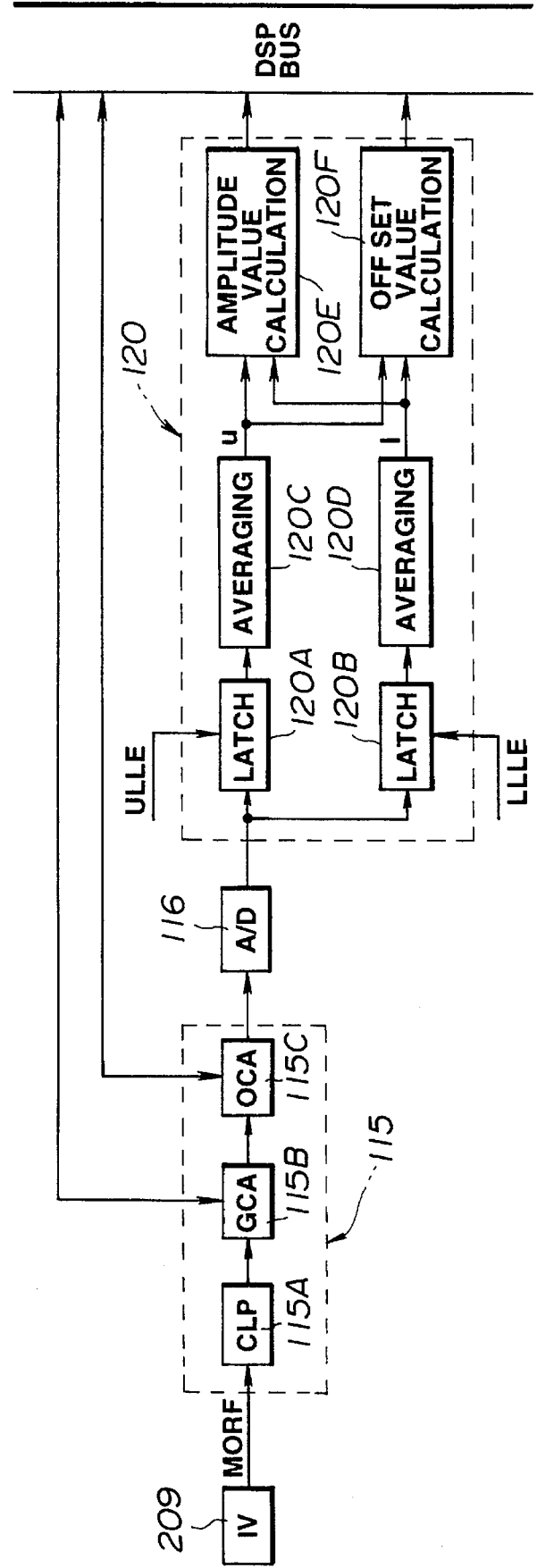
FIG. 6 is a block diagram of a preferred embodiment of the present invention which may be used in the disk drive shown in FIG. 5.

Those portions of the analog signal processor (ASP) 115 and recording/reproducing circuit 120 that are relevant to the present invention are illustrated in the block diagram of FIG. 6. As shown, ASP 115 includes a clamp circuit 115A, a gain control amplifier 115C and an offset control amplifier 115C. Recording/reproducing circuit 120 includes latch circuits 120A and 120B, averaging circuits 120C and 120D, and calculating circuits 120E and 120F. Clamp circuit 115A of ASP 115 is adapted to clamp to a reference level the base, or minimum, level of the MORF signal supplied from I/V converter and amplifier 209; and the clamped signal then is coupled to gain control amplifier 115B which is supplied with a gain control signal (to be described) in order to vary the gain thereof. The gain controlled signal produced by gain control amplifier 115B is subject to an offset adjustment by offset control amplifier 115C as a function of an offset control signal supplied thereto (to be described), thereby minimizing or compensating drift that may be present in the reference or zero level of the MORF signal. The resultant gain and offset controlled signal produced at the output of offset control amplifier 115C is coupled to A/D converter 116 and, as a result of the gain and offset adjustments that are made thereto, such signal is well within the dynamic range of the A/D converter.

The A/D converter shown in FIG. 6 digitizes the gain and offset adjusted signal; and the digitized signal is coupled to latch circuits 120A and 120B which function as sample-and-hold circuits to sample predetermined portions of the digitized signal. The portion of recording/reproducing circuit 120 that is illustrated in FIG. 6 is operable when the reference pattern shown in FIG. 4A is read from disk 201. For convenience, the following discussion of the latch, averaging and calculating circuits included in recording/reproducing circuit 120 refers to the analog waveform of the reference pattern shown in FIG. 4A; even though it will be readily appreciated that the digitized version of this waveform is processed.

Latch circuit 120A is referred to as an upper level latch circuit and is supplied with latch pulses ULLE which, as will be described below, are generated by timing generator 119 to coincide with the upper amplitude levels of the 8T waveform of the reference pattern. Latch circuit 120B is a lower level latch circuit supplied with latch pulses LLLE produced by timing generator 119 and timed to coincide with the lower amplitude level of the 8T waveform of the reference pattern. Thus, samples or representations of the upper and lower amplitude levels of the reference pattern are latched in upper and lower level latch circuits 120A and 120B, respectively. It is recalled that the reference pattern is repeated in a plurality of blocks (e.g. 4 blocks); and the upper and lower amplitude levels in each block are latched in upper and lower level latch circuits 120A and 120B, respectively. The outputs of these latch circuits are coupled to averaging circuits 120C and 120D, whereupon averaging circuit 120C averages the plural upper amplitude level samples that have been latched and averaging circuit 120D averages the plural lower amplitude level samples that have been latched. Both the averaged upper level samples u and averaged lower level samples 1 are coupled to calculating circuits 120E and 120F which function in the manner discussed below to calculate amplitude and offset control values. These control values are fed back by the DSP bus to gain control amplifier 115B and to offset control amplifier 115C, respectively, thereby setting the proper gain and offset levels for these amplifiers. Consequently, fluctuations in gain and offset that may be present in the MORF signal are compensated as a function of what is expected to be very similar variations in gain and offset in the reference pattern.

Figure 7:
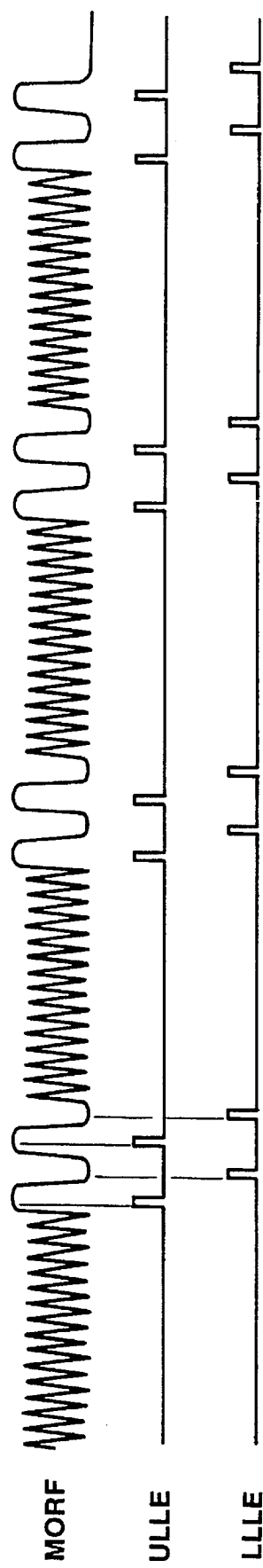
FIG. 7 is a schematic representation of the manner in which the reference pattern is sampled for the purpose of providing gain and offset controls in the embodiment shown in FIG. 6.

The manner in which the latch, averaging and calculating circuits included in recording/reproducing circuit 120 (and shown in FIG. 6) operate now will be described. As illustrated in FIG. 7 the upper level latch pulses ULLE produced by timing generator 119 sample the upper amplitude levels of the reference pattern during each repeated block of that reference pattern. Although two samples per block are shown in FIG. 7, it will be appreciated that any desired number of samples may be obtained. Similarly, the lower amplitude levels of the reference pattern are sampled by lower level latch pulses LLLE. The latched upper and lower levels of the reference pattern are stored temporarily (as in conventional latch devices) and the stored upper level samples are averaged by averaging circuit 120C while the stored lower level samples are averaged by averaging circuit 120D. Hence, averaging circuit 120C produces the averaged latched upper level samples u and averaging circuit 120D produces the averaged latched lower level samples 1 (referred to, for convenience, simply as the averaged upper and lower levels, respectively).

Calculating circuit 120E operates as an amplitude value calculating circuit to calculate the amplitude control value AMP by averaging the averaged upper and lower levels u and 1. The amplitude value calculating circuit thus operates to produce:

$$AMP=(u+l)/2$$

Calculating circuit 120F operates as an offset value calculating circuit to calculate the offset control value OFS as a function of the averaged upper and lower levels u and 1. The offset value calculating circuit thus produces the offset control value:

$$OFS=(u-l)/2$$

The amplitude control value AMP produced by amplitude value calculating circuit 120E is fed back via the DSP bus to gain control amplifier 115B, thereby setting the gain of this amplifier as a function of the amplitude control value. Similarly, the offset control value produced by offset value calculating circuit 120F is fed back via the DSP bus to offset control amplifier 115C, thereby setting the offset for this amplifier. It is appreciated that if the distinct amplitude levels of the reference pattern fluctuate, the amplitude and offset control values change in a similar manner, thereby adjusting the gain and offset settings of the gain and offset control amplifiers. Since the amplitude and offset of the data signals recovered from the pit patterns scanned from disk 201 are expected to change in a manner similar to changes in the reference pattern, such gain and offset adjustments effected by gain and offset control amplifiers 115B and 115C serve to compensate for such fluctuations. Hence, even though the data signals may vary, they are controlled to be well within the dynamic range of A/D converter 116; and as a result, the information read from disk 201 may be accurately sensed, decoded and supplied to computer 300.

In the foregoing discussion, calculating circuits 120E and 120F have been described as operating upon the averaged upper and lower levels detected from four repeated blocks of the reference pattern. It has been further described that the four blocks of the reference pattern are present in the leading portion of a sector of data recorded on disk 201. The present invention contemplates that samples of the upper and lower amplitude levels of the reference pattern picked up from several sectors may be averaged such that the calculating circuits operate on averaged levels derived from the reference pattern recorded in a plurality of sectors.

In the foregoing discussion, the reference pattern shown in FIG. 4A is described as being recorded in the leading portion of each sector of data recorded of disk 201. As an alternative, the reference pattern may be recorded in a test area on disk 201, such as in an inner portion of the disk or in an outer portion of the disk positioned outside the user information area. In that event, when an MO disk is loaded onto drive section 200 by loading mechanism 202 (FIG. 5), the laser head may be positioned to the test area on the disk and then, once the disk is brought up to proper rotary speed, magnetic head 211 and laser diode 207 are operated to record the reference pattern in this test area.

While the present invention has been particularly shown and described with reference to a preferred embodiment, it will be readily appreciated by those of ordinary skill in the art that various changes and modifications may be made without departing from the spirit and scope of the invention. For example, FIG. 7 illustrates two cycles of the 8T waveform in each block of the reference pattern, with the upper and lower amplitude levels of each cycle being sampled and latched. Although one sample of the upper amplitude level and one sample of the lower amplitude level for each cycle are shown, it will be appreciated that several samples per cycle may be latched.

It is intended that the appended claims be interpreted as covering the embodiment that has been specifically described herein, those changes which have been mentioned, those changes which will become apparent, and all equivalents thereto.

What is claimed is:

1. Apparatus for reproducing data from a magneto-optical disk, said data being recorded in a track which contains a reference pattern exhibiting distinct amplitude levels, said apparatus comprising:

an optical head for reading data in said track;

gain control means supplied with a signal read by said optical head and having an adjustable gain to vary the gain of said signal;

offset control means supplied with a gain-controlled signal from said gain control means and adjustable to vary the offset of said gain-controlled signal;

level detecting means for detecting upper and lower amplitude levels in the reference pattern read by said optical head; and calculating means responsive to said upper and lower amplitude levels to calculate amplitude and offset control values for adjusting the gain and offset of said gain control and offset control means, respectively, whereby data read by said optical head is reproduced with predetermined gain and offset.

2. The apparatus of claim 1 wherein said reference pattern is repeated in a plurality of blocks, with each block containing said upper and lower amplitude levels.

3. The apparatus of claim 2 wherein each block of said reference pattern includes a first periodic waveform exhibiting a first repetition rate and having said upper and lower amplitude levels, and a second periodic waveform exhibiting a second repetition rate greater than said first repetition rate and subject to phase changes, said second periodic waveform being detectable to synchronize a clock to rotation of said disk.

4. The apparatus of claim 1 wherein said level detecting means comprises sampling means supplied with sampling pulses to sample said upper and lower amplitude levels in the reference pattern; and timing means synchronized with rotation of said disk to generate said sampling pulses.

5. The apparatus of claim 4 wherein said sampling means includes upper level latch means for latching the sampled upper level of said reference pattern and lower level latch means for latching the sampled lower level of said reference pattern.

6. The apparatus of claim 5 wherein said reference pattern is repeated in a plurality of blocks; wherein said upper and lower level latch means latch the respective upper and lower level samples of plural blocks of said reference pattern; and wherein said calculating means includes upper and lower level averaging means for averaging the latched upper and lower level samples from which the amplitude and offset control values are derived.

7. The apparatus of claim 6 wherein said calculating means further comprises amplitude control means for producing said amplitude control value by averaging the averaged latched upper and lower level samples with each other.

8. The apparatus of claim 6 wherein said calculating means further comprises offset control means for producing said offset control value as a function of the difference between the averaged latched upper and lower level samples.

9. The apparatus of claim 6 wherein said calculating means further comprises amplitude control means for producing said amplitude control value as a function of the sum of the averaged latched upper and lower level samples, offset control means for producing said offset control value as a function of the difference between the averaged latched upper and lower level samples, and feedback means for feeding back the amplitude control value to said gain control means and for feeding back the offset control value to said offset control means.

10. The apparatus of claim 6 wherein said reference pattern includes plural cycles of said upper and lower levels in each block; and said sampling means samples each cycle of said upper level and each cycle of said lower level in each block.

11. The apparatus of claim 1 wherein said data is recorded on said disk in sectors, each sector comprising plural data segments interspersed with servo areas; and said reference pattern is distributed in a number of data segments located in a leading position of each sector.

12. Apparatus for recording information on and reproducing information from a magneto-optical disk, said information being recorded in sectors in a track as pits, with each sector being comprised of data segments interspersed with servo areas, said apparatus comprising:

recording means for recording useful information and a reference pattern in a sector, said reference pattern being recorded in a number of data segments located in a leading position of each sector and exhibiting distinct amplitude levels;

an optical head for reading said reference pattern and said useful information from a track;

gain control means supplied with a signal read by said optical head and having an adjustable gain to vary the gain of said signal;

offset control means supplied with a gain-controlled signal from said gain control means and adjustable to vary the offset of said gain-controlled signal;

level detecting means for detecting upper and lower amplitude levels in the reference pattern read by said optical head; and calculating means responsive to said upper and lower amplitude levels to calculate amplitude and offset control values for adjusting the gain and offset of said gain control and offset control means, respectively, whereby useful information read by said optical head is reproduced with predetermined gain and offset.

13. The apparatus of claim 12 wherein said reference pattern is repeated in a plurality of blocks, with each block containing said upper and lower amplitude levels.

14. The apparatus of claim 13 wherein each block of said reference pattern includes a first periodic waveform exhibiting a first repetition rate and having said upper and lower amplitude levels, and a second periodic waveform exhibiting a second repetition rate greater than said first repetition rate and subject to phase changes, said second periodic waveform being detectable to synchronize a clock to rotation of said disk.

15. The apparatus of claim 14 wherein said level detecting means comprises sampling means supplied with sampling pulses to sample said upper and lower amplitude levels in the reference pattern; and timing means synchronized with rotation of said disk to generate said sampling pulses.

16. The apparatus of claim 15 wherein said sampling means includes upper level latch means for latching the sampled upper level of said reference pattern and lower level latch means for latching the sampled lower level of said reference pattern.

17. The apparatus of claim 16 wherein said reference pattern is repeated in a plurality of blocks; wherein said upper and lower level latch means latch the respective upper and lower level samples of plural blocks of said reference pattern; and wherein said calculating means includes upper and lower level averaging means for averaging the latched upper and lower level samples from which the amplitude and offset control values are derived.

18. The apparatus of claim 17 wherein said calculating means further comprises amplitude control means for producing said amplitude control value by averaging the averaged latched upper and lower level samples with each other.

19. The apparatus of claim 17 wherein said calculating means further comprises offset control means for producing said offset control value as a function of the difference between the averaged latched upper and lower level samples.

20. The apparatus of claim 12 wherein said magneto-optical disk includes a test area, and said recording means is operable to record said reference pattern in said test area when a magneto-optical disk is introduced for recording.

* * * * *